United States Patent
Varma et al.

(10) Patent No.: US 7,546,399 B2
(45) Date of Patent: Jun. 9, 2009

(54) STORE AND FORWARD DEVICE UTILIZING CACHE TO STORE STATUS INFORMATION FOR ACTIVE QUEUES

(75) Inventors: Anujan Varma, Santa Cruz, CA (US); Robert C. Restrick, Hopatoong, NJ (US); Jaisimha Bannur, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1447 days.

(21) Appl. No.: 10/396,288

(22) Filed: Mar. 24, 2003

(65) Prior Publication Data

US 2004/0037302 A1 Feb. 26, 2004

Related U.S. Application Data

(60) Provisional application No. 60/367,523, filed on Mar. 25, 2002.

(51) Int. Cl.
  *G06F 3/00* (2006.01)
  *G06F 5/00* (2006.01)
  *G06F 13/00* (2006.01)

(52) U.S. Cl. .................. 710/52; 710/112; 710/317

(58) Field of Classification Search .............. 710/52
  See application file for complete search history.

(56) References Cited

U.S. PATENT DOCUMENTS

| 5,859,835 A * | 1/1999 | Varma et al. ............. 370/229 |
| 6,304,932 B1 * | 10/2001 | Ziegler et al. ............. 710/112 |
| 6,687,781 B2 * | 2/2004 | Wynne et al. ............. 710/317 |
| 2002/0065865 A1 * | 5/2002 | Gilbert .................... 709/102 |
| 2003/0147375 A1 * | 8/2003 | Goergen et al. ............. 370/351 |

* cited by examiner

*Primary Examiner*—Alford W Kindred
*Assistant Examiner*—Brooke J Dews
(74) *Attorney, Agent, or Firm*—Ryder IP Law; Douglas J. Ryder

(57) ABSTRACT

In general, in one aspect, the disclosure describes an apparatus capable of queuing and de-queuing data stored in a plurality of queues. The apparatus includes a status storage device to track status for each of the plurality of queues, a status cache to track status for a subset of the plurality of queues that are undergoing processing, and a queuing engine to queue incoming data and de-queue outgoing data. The queuing engine receives and updates the status for the subset of the plurality of queues from the status cache and receives and updates the status for remaining queues from the status storage device.

36 Claims, 14 Drawing Sheets

STORE AND FORWARD DEVICE UTILIZING CACHE TO STORE STATUS INFORMATION FOR ACTIVE QUEUES

This application claims priority under 35 U.S.C. §119(e) of U.S. Provisional Application No. 60/367,523 entitled "Method and Apparatus for High-Speed Queuing and Dequeuing of data in a Switch or Router Using Caching of Queue State" filed on Mar. 25, 2002 which is herein incorporated by reference, but is not admitted to be prior art.

BACKGROUND

In communication networks today, store-and-forward devices, such as packet switches and routers, support throughputs as high as tens of Gigabits per second per port. A key operation in such store-and-forward devices is the queuing of incoming data into memory, followed by the subsequent de-queuing of the data, before sending to its destination. In a high-speed switch or router, the queuing operation can be implemented in hardware, including digital logic, such as an application specific integrated circuit (ASIC), or a field-programmable gate array (FPGA), in conjunction with semiconductor memory that holds the packet data and control information for the queues.

Many packet-based network protocols send data and control messages in packets that may be as small as 40 bytes in size. The router or switch must be designed to deal with the smallest-size packet generated by these protocols to maintain full throughput. Each of the packets passing through the switch or router may need to be queued into an associated queue, or may need to be de-queued from the queue. This places stringent demands on the performance of the switch or router. For example, to support a throughput of 10 Gigabits/second per port, the time interval between the arrivals of consecutive 40-byte packets is only 32 nanoseconds ($32 \times 10^9$ seconds). Therefore, the switching system should be designed to support one queuing operation and one de-queuing operation within 32 nanoseconds.

The processing needed to queue a packet includes the following basic operations. First, the queue number associated with the incoming packet is determined from identifying information present in the header of the packet. The control information for that particular queue is then read from a control memory, using the queue number as the index. The control information is then used to link the incoming packet to the linked list corresponding to the queue. The control information is modified to reflect the addition of the new packet. Finally, the updated control information needs to be written back into the control memory.

The processing operations needed for de-queuing a packet from the head position of a specific queue are similar. As before, it involves reading the control information from control memory, un-linking the packet (resulting in the modification of the control information), and then writing back the updated control information.

To achieve full throughput in a high-speed switch or router, the operations associated with the queuing and de-queuing operations are often executed in a pipeline, so that one queuing and de-queuing operation can be initiated in every clock cycle. Modern memory technologies, such as the quad data rate (QDR) family of static random-access memories (SRAMs), support such pipelined operation. QDR memory devices have two data ports, one for reads and the other for writes, which enable a read and a write operation to be performed in parallel. Each port also operates in a DDR (double data rate) fashion, transferring two words of data in every cycle of the memory clock.

Although the pipeline memory devices such as QDR support very high throughputs, they have long latencies. That is, a read operation must wait for several clock cycles from starting the operation before data becomes available from the device. Similarly, a write operation takes several cycles for the data to be updated in memory. This long latency may be the result of pipelining within the memory device, or pipeline stages introduced for tolerating the delay in the data path between the memory and processing logic, or both. The pipeline allows a new operation to be started every cycle when the new operation does not depend on the results of any of the pending operations already in the pipeline. When two operations are dependent, however, starting one of the operations without completing the previous one can lead to inconsistency of the queue state and data corruption. To avoid inconsistency in the queue state, a queuing or de-queuing operation acting on a specific queue must wait until the previous operation on the same queue has been completed. This results in long delays and reduced throughput when multiple operations (for example, a queuing followed by a de-queuing) take place on the same queue close together in time: The second operation must wait for the full latency of the memory device after starting the first operation.

BRIEF DESCRIPTION OF THE DRAWINGS

The features and advantages of the various embodiments will become apparent from the following detailed description in which.

DETAILED DESCRIPTION

Figure 1:
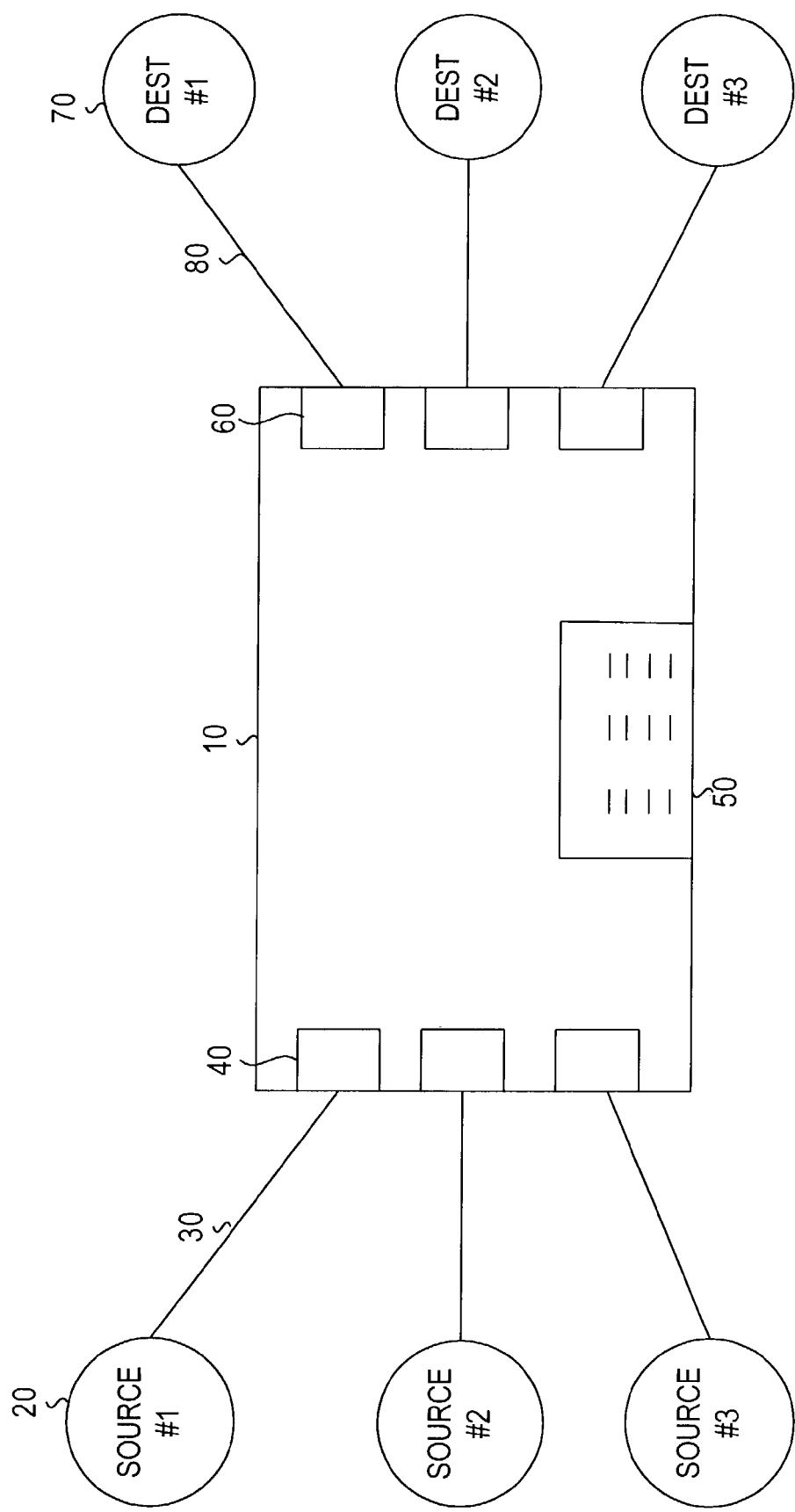
FIG. 1 illustrates an exemplary high-level diagram of a system within which various embodiments could be implemented.

FIG. 1 illustrates an exemplary high-level diagram of a system that includes a store and forward device, 10, such as a packet switch or a router used in communications systems. The device 10 receives data from multiple sources 20 (e.g., computers, other store and forward devices) over multiple communication links 30 (e.g., twisted wire pair, fiber optic, wireless). Each of the sources 20 may be capable of transmitting data at different speeds, different quality of service, etc. over different communication links 30. For example, the system may transmit the data using any number of protocols including Asynchronous Transfer Mode (ATM), Internet Protocol (IP), and Time Division Multiplexing (TDM). The data may be sent in variable length or fixed length blocks, such as cells, packets or frames.

The store and forward device 10 has a plurality of receivers (ingress modules) 40 for receiving the data from the various sources 20 over the different communications links 30. Different receivers 40 will be equipped to receive data having different attributes (speed, protocol, etc.). The data is stored in a plurality of queues 50 until it is ready to be transmitted. The queues 50 may be stored in any type of storage device and preferably are stored within a hardware storage device such as semiconductor memory, on chip memory, off chip memory, field-programmable gate arrays (FPGAs), random access memory (RAM), or a set of registers. The store and forward device 10 further includes a plurality of transmitters (egress modules) 60 for transmitting the data to a plurality of destinations 70 over a plurality of communication links 80. As with the receivers 40, different transmitters 60 will be equipped to transmit data having different attributes (speed, protocol, etc.). The receivers 40 are connected through a backplane (not shown) to the transmitters 60. The backplane may be electrical or optical. The receivers 40 and the transmitters 60 may be two sides of a line card. The line cards may be Ethernet (e.g., Gigabit, 10 Base T), ATM, Fiber channel, Synchronous Optical Network (SONET), and Synchronous Digital Hierarchy (SDH), amongst others.

Figure 2:
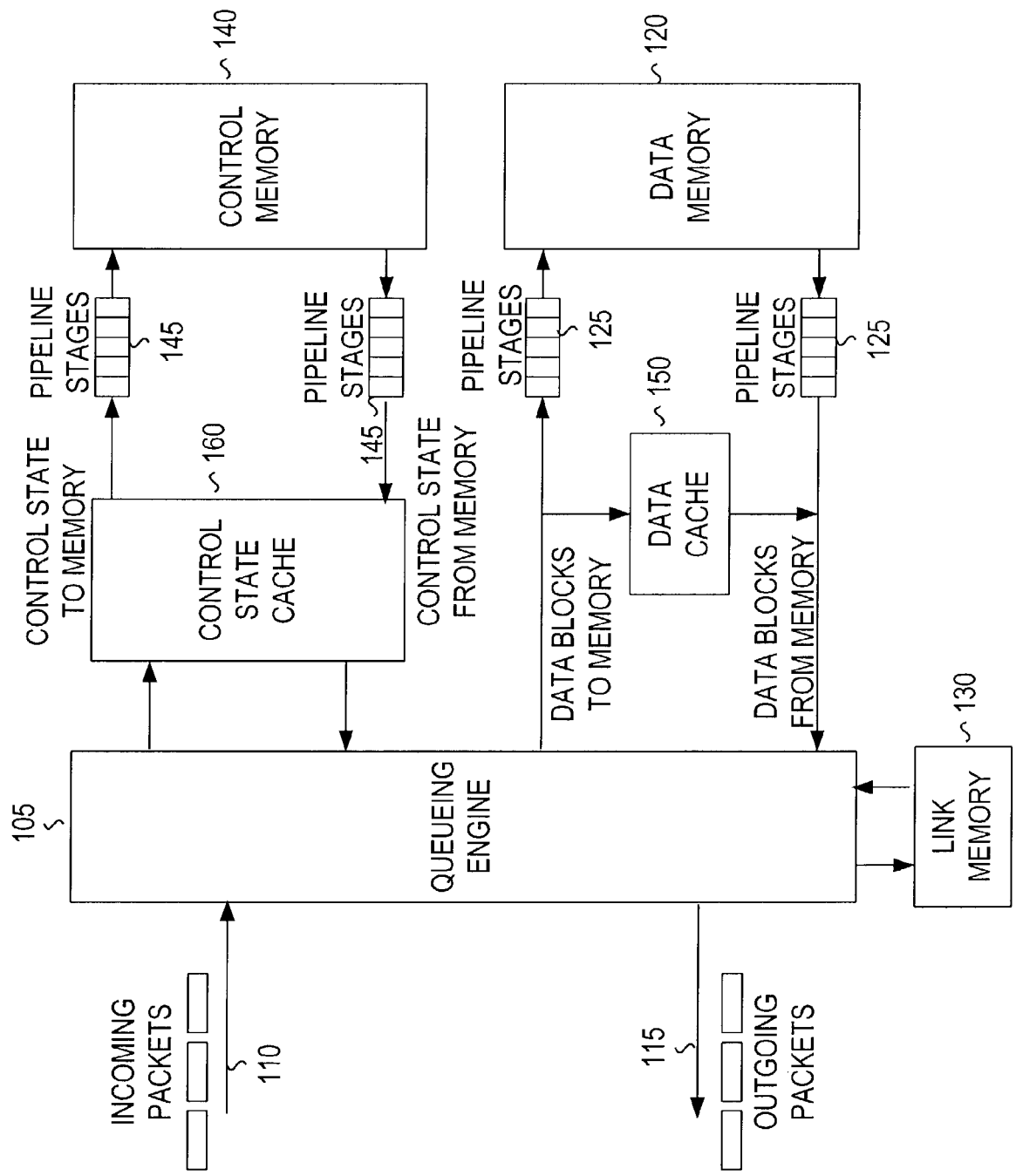
FIG. 2 illustrates an exemplary block diagram of a packet queuing system, according to one embodiment.

FIG. 2 illustrates an exemplary block diagram of a packet queuing system. A queuing engine 105 performs processing associated with the queuing of incoming data (e.g., packets) 110 and de-queuing of outgoing data (e.g., packets) 115. The queuing engine 105 examines each incoming data 110 to determine its associated queue index and inserts the incoming data 110 into a corresponding queue. Upon receiving a request from an external scheduler, the queuing engine 105 also de-queues the outgoing data 115 from the queuing structure, forward them out of the system 100, and modify the queue state information to reflect the removal of the data.

A data memory 120 holds the contents of all the data (e.g., packets) currently in the queuing system 100. The data memory 120 may be any type of storage device and preferably is a hardware storage device such as semiconductor memory, on chip memory, off chip memory, field-programmable gate arrays (FPGAs), random access memory (RAM), a set of registers, or other memory devices. The data memory 120 is divided into blocks, each holding data (e.g., a packet) or a portion of the data (e.g., part of the packet). If the arriving data is larger than the size of a block in the data memory 120, the data is broken into multiple parts by the queuing engine 105 and each part is queued in a block in the data memory 120. Similarly, during the de-queuing operation, all the constituent parts of data are read out separately from the data memory 120 and re-assembled by the queuing engine 105.

Each stored data item (e.g., packet) belongs to a queue. In a large queuing system there can be thousands or even millions of queues. The blocks associated with a specific queue are linked together to facilitate insertion and removal of blocks. The blocks in the data memory 120 are allocated to queues on demand. All the unused blocks in the data memory 120 are maintained in a free list. When new data arrives, one or more blocks are retrieved from the free list and allocated for the new data. Likewise, when data is de-queued, the freed block (or blocks) are added to the free list.

The pointers used to link the blocks in the data memory 120 to a queue are stored in a link memory 130. The link memory 130 may be any type of storage device and preferably is a hardware storage device. Examples of such storage devices include semiconductor random-access memory (RAM), which may be integrated with the processing operations on a single chip, or may be on a device separate from the processing device (e.g., on-chip memory in a field-programmable gate array (FPGA) or a set of registers). There is a link pointer in the link memory 130 corresponding to each block in the data memory 120. The link pointer points to the next block in the data memory 120 to which the data is stored. The link corresponding to a block is accessed using the same address used to access the data memory 120.

A control state associated with each of the queues is stored in a control memory 140 (status memory). The control memory 130 may be any type of storage device and preferably is a hardware storage device. Examples of such storage devices include semiconductor random-access memory (RAM), which may be integrated with the processing operations on a single chip, or may be on a device separate from the processing device (e.g., on-chip memory in a field-programmable gate array (FPGA) or a set of registers). The control state information includes the head and tail pointers for the linked blocks associated with the corresponding queue, counts of blocks, packets and/or bytes currently in that queue, and other queue state information specific to the system. During each queuing or de-queuing operation, the queuing engine 105 reads the control state, modifies it, and writes back to the control memory 140.

Figure 3:
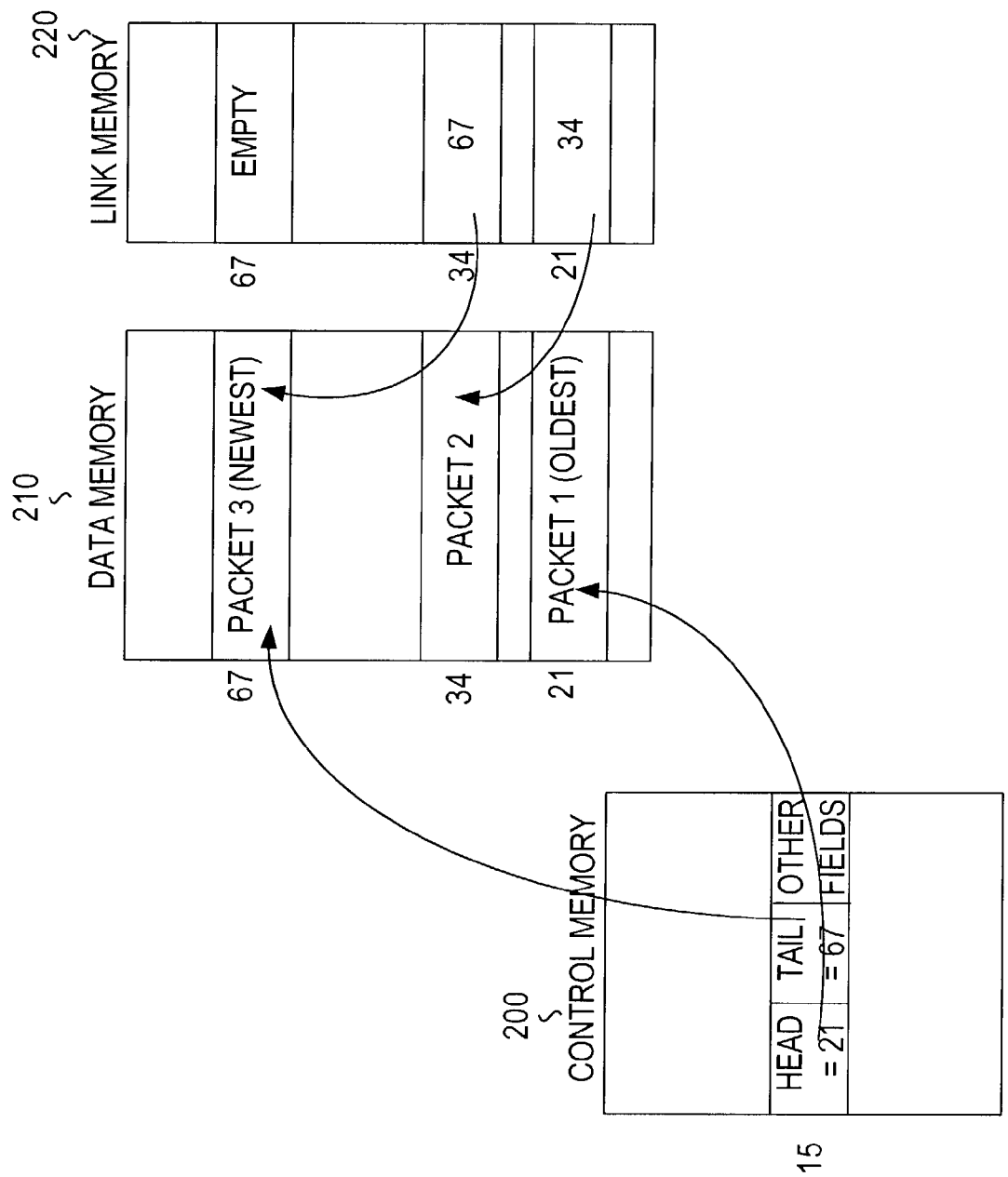
FIG. 3 illustrates an exemplary block diagram of interactions between the various memories, according to one embodiment.

FIG. 3 illustrates an exemplary block diagram of interactions between a control memory 200, a data memory 210 and a link memory 220. The control memory is indexed in a fashion that the index number corresponds to the queue address for the associated queue. The data memory has data stored in a plurality of blocks. If more than one block is required to store the data for a particular queue, the data is stored in a plurality of blocks. The blocks that the data is stored in is based on the blocks that are available at the time. The first and last block are recorded in the control memory 200 as the head and tail respectively. Moreover, the link memory 220 is organized like the data memory and each associated block in the link memory 220 lists the next block in the data memory 210 that is associated with the particular queue.

In order to further explain the relationship, we will assume that the system received a queue having a queue address of 15 for processing. The control data for queue address 15 is retrieved from the control memory 200 (index 15). The control data for index 15 includes head and tail pointers (blocks 21 and 67 respectively). The data within block 21 of the data memory 210 is the oldest (first stored) data (packet) for that particular queue. The data within block 67 would be the newest (most recently added) data (packet) for the queue. Block 21 in the link memory 220 lists block 34 as the link because block 34 is the next block associated with the queue. Block 34 in the link memory 220 lists block 67 as the next block. Block 67 is empty because block 67 is the last block associated with the queue. In addition to the head and tail pointers in the control memory, other fields are included for each queue. The other fields may include a count of the packets and/or bytes in the corresponding queue, status of the processing for the queue (discussed in detail later) or other data.

Figure 4:
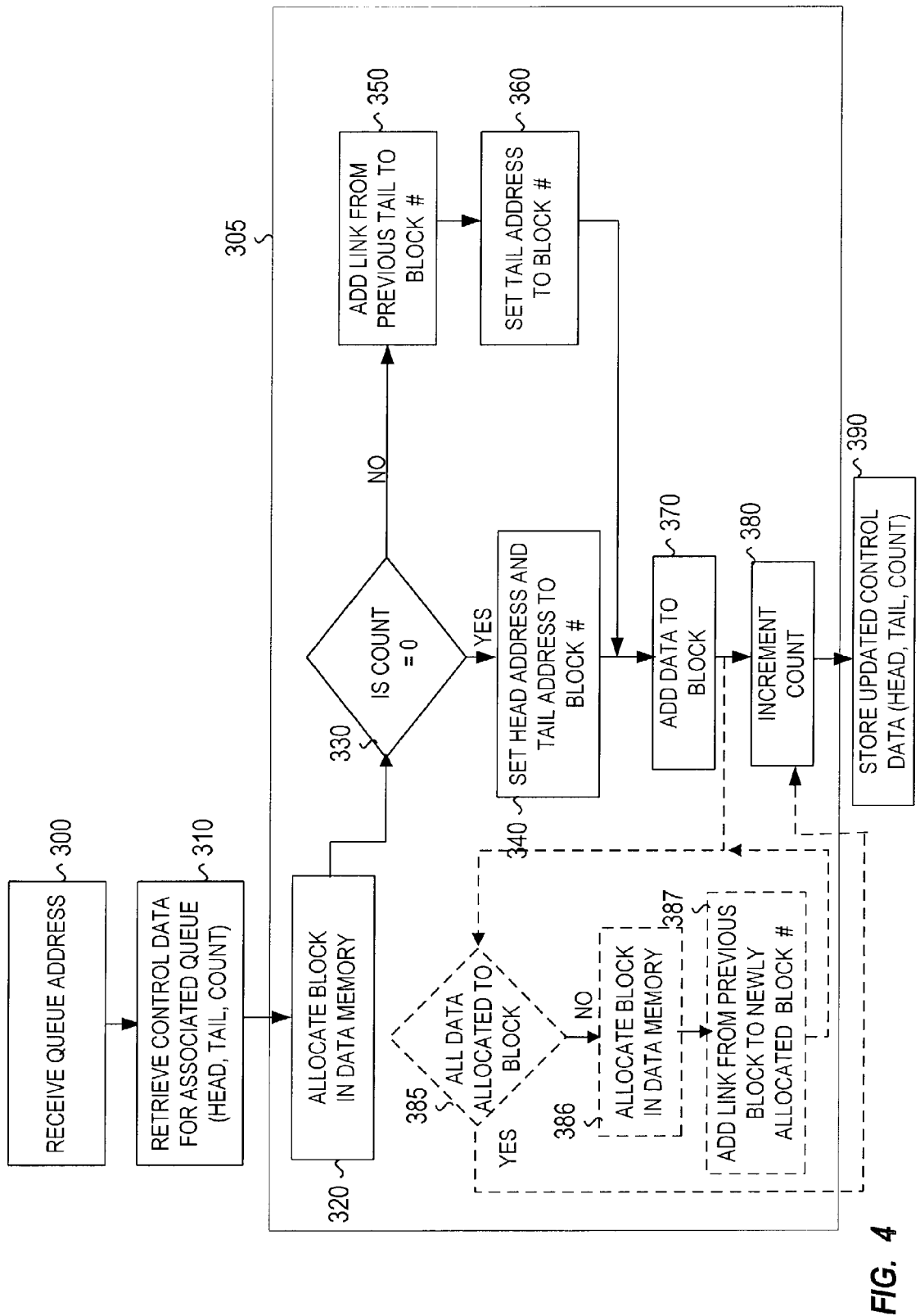
FIG. 4 illustrates an exemplary process associated with an en-queuing operation (adding data), according to one embodiment.

FIG. 4 illustrates an exemplary process associated with an en-queuing operation (adding data). Once the address of the queue is received (300), the control data (head, tail and count) for the associated queue is received from the control memory (310). A block in data memory from the free list is allocated to store the data (320). A determination is made as to whether this is a first block of data associated with the queue (330), that is, if the queue was empty upon the arrival of the data. This is achieved by checking the count value for zero (0). If the count value is zero (330 Yes) the head address and the tail address are both set to the address of the allocated block (340), as this is the only data item (packet) associated with the queue. If the count value is non-zero (330 No) the link in the link memory corresponding to the current tail of the queue is modified to point to the newly allocated block in data memory (350) and the tail address is set to the allocated block (360). The data is then added to the block (370) and the count value is incremented (380). The updated control data (head, tail and count) is then stored in the control memory (390).

The process including 320-380 can be considered as adding the data for the associated queue (305). Thus the overall process can be looked at as three main processes: reading the control data (310), adding the data for the queue (305) and writing the updated control data (390). According to one embodiment (discussed in detail later), each main process 310, 305, 390 may take or be allocated one pipeline stage.

It should be noted that for convenience, and ease of understanding, the exemplary process flow of FIG. 4 assumes that the data (e.g., packet) fits within a single block of the data memory. If the data did not fit in a single block, a new block would need to be allocated for each fragment of data (packet) so as to store the data in multiple blocks of the data memory. For example, according to one embodiment (indicated by the dashed lines) after the first fragment was stored in the first block (370) a determination could be made as to whether all the data fits within the block (385). If all the data was not completely allocated (385 No) the process would allocate a new block in the data memory (386), and link this new block to the current block (387). The process 385-387 is repeated until the entire data item (packet) has been completely stored (allocated) in the data memory. When all the data was allocated (385 Yes) the process returns to update the count (380) and store the updated control data in the control memory (390). A separate block count may optionally be stored as part of "Other Fields" in the control memory 200 to keep track of the number of blocks allocated to the data item (packet).

The various embodiments should in no way be limited to the exemplary process flow described above. Numerous modifications could be made to the process flow (e.g., the order could be rearranged and/or individual operations could be combined or split apart). For example, the count value maintained for each queue in the control memory 200 may be in terms of the number of packets, bytes, words, or blocks associated with the corresponding queue. The increment operation (380) would accordingly update the count by:

1 if the count value were in terms of packets;
the number of bytes in the current data item (packet) if the count value were in terms in bytes; and
the number of bytes in the current data item (packet) if the value were in terms of blocks.

Figure 5:
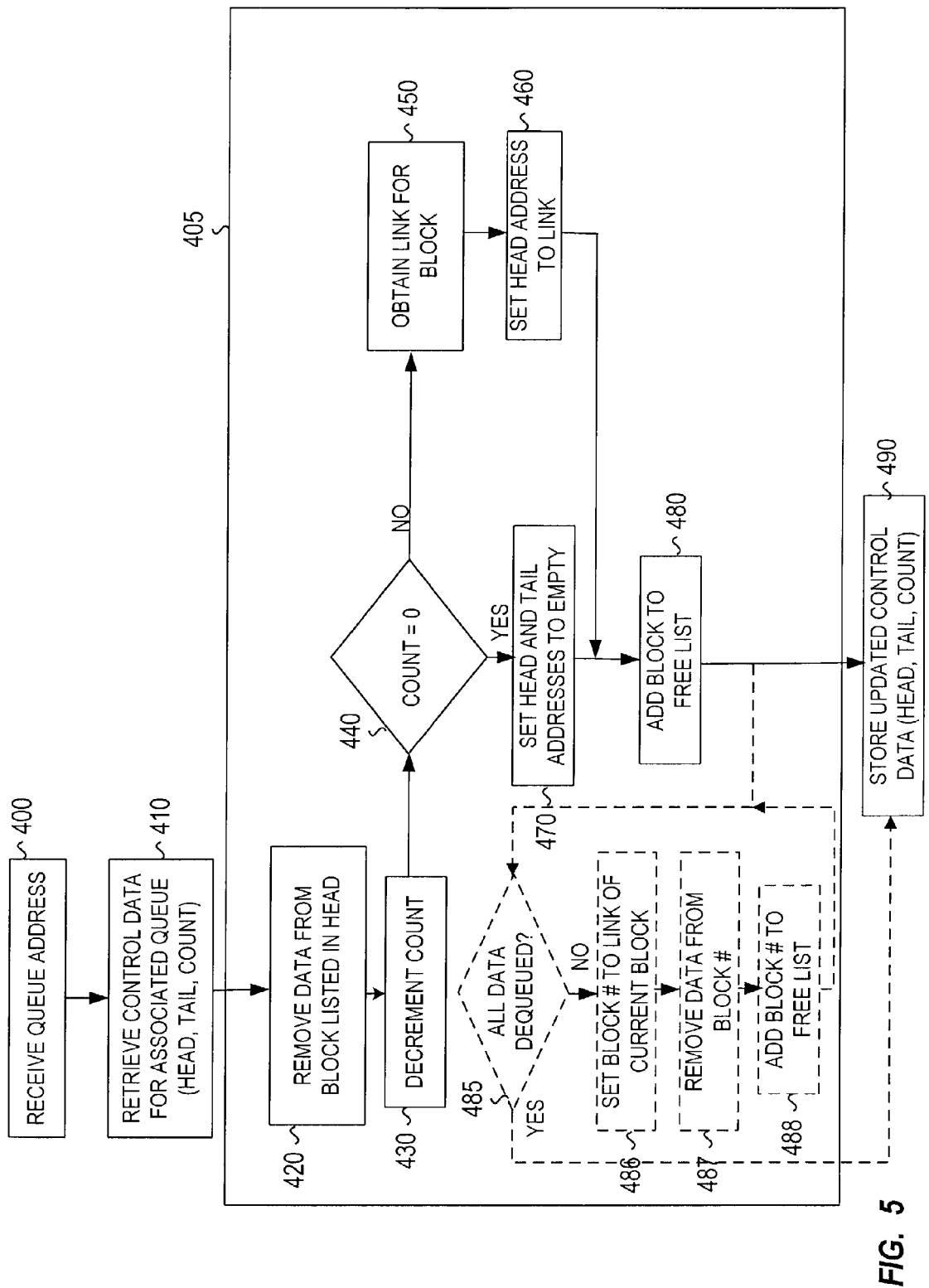
FIG. 5 illustrates an exemplary process associated with a de-queuing operation (removing data), according to one embodiment.

FIG. 5 illustrates an exemplary process associated with a de-queuing operation (removing data). Once the address of the queue is received (400), the control data (head, tail and count) for the associated queue is retrieved from the control memory (410). Data (e.g., packets) are removed from the block associated with the head address and sent to the queuing engine for processing (420). The count for the number of blocks associated with the queue is decremented (430). A determination is then made as to whether the count is zero (440). If the count is non-zero (440 No), the link listed in the link memory for that block is obtained (450) and the head is set to this link (460). If the count was zero (440 Yes), the head and tail addresses are both set to empty (470), to indicate that the queue is empty. The block is then added to the list of free blocks so that it can be used again (480). The updated control data (head, tail and count) is then stored in the control memory (490).

The process including 420-480 can be considered as removing the data for the associated queue (405). Thus the overall process can be looked at as three main processes: reading the control data (410), removing the data for the queue (405) and writing the updated control data (490). According to one embodiment (discussed in detail later), each main process 410, 405, 490 may take or be allocated one pipeline stage.

It should be noted that for convenience, and ease of understanding, the exemplary process flow of FIG. 5 assumes that the data (e.g., packet) fits within a single block of the data memory. If the data did not fit in a single block the remove data process (405) would need to read each fragment of the data item (packet) from a separate block, and de-allocate each of the separate blocks of the data memory. For example, according to one embodiment (indicated by the dashed lines) after the block was added to the free list (480) a determination is made as to whether all the data was de-queued from all the associated blocks (485). If all the data was not de-queued (485 No) the link corresponding the current block being de-queued is obtained and the block number is set to the link (486) and the data from the block is removed (e.g., de-queued) (487). The block is then added to the free list (488). The process including 485-488 is repeated until all blocks associated with the current data item (packet) have been de-queued and added to the free list. When all the blocks have been de-queued (485 Yes), the updated control data can be stored in the control memory (490).

The various embodiments should in no way be limited to the exemplary process flow described above. Numerous modifications could be made to the process flow (e.g., the order could be rearranged and/or individual operations could be combined or split apart).

In high-speed queuing systems, the data paths between the queuing engine and the memories may be pipelined to achieve high throughput. Pipelining enables a new read or write operation to be started every cycle, while previously issued reads or writes are still pending. Referring back to FIG. 2, the data memory 120 and the control memory 140 are both pipelined. The link memory 130 is not pipelined as it is assumed to have a small access latency (one or two clock cycles), so that it can support the loading and storing of links at the rate necessary to achieve full-speed operation of the queuing system.

Pipelining between the queuing engine 105 and the data memory 120 is achieved by having several pipeline stages 125 for the path from the queuing engine 105 to the data memory 140 and several pipeline stages 145 for the path from the data memory 140 to the queuing engine 105. These pipeline stages may be provided (1) external to the memory device by means of registers, latches, etc.; (2) as part of the data memory if the data memory has an internal pipeline, such as provided with quad data rate static random access memory (QDR SRAM) devices; or (3) both externally from and internally within the data memory.

A problem with such pipelining is that if a read operation is started while a write operation on the same queue has not competed in the pipeline, wrong data may be read out from memory. This problem can be solved by the use of a data cache 150 that maintains a copy of the data being written into the data memory 120 by all the pending write operations in the pipeline. The data cache 150 may be any type of storage device and preferably is a temporary hardware storage device. When a read is started, its block address is compared with the addresses of the pending writes in the data cache 150. If there is a match, the most recently stored data for that address is forwarded from the data cache 150, thus avoiding stale data from being read out from data memory 120.

The data being transmitted to/from the queuing engine 105 from/to the control memory 140 may also need to be pipelined to support a throughput of one operation per cycle. This may require several pipeline stages 145 in both directions. The pipeline stages 145 may include registers or latches external to the control memory 140, or may be part of the control memory 140, or may be some combination of both. If pipelining is utilized, consistency of the control state information must be maintained throughout the queuing and de-queuing operations. As previously discussed, the queuing and de-queuing operations include a read from the control memory, update, and write to the control memory. If any of these operations for a particular queue interleave with any other operation for that queue, the control memory state for the queue may become inconsistent. This, in turn, may lead to a corruption of the entire queue state and a failure of the system. In order to overcome the consistency problem while manipulating the control state during queuing and de-queuing operations a control state cache 160 (status cache) is introduced between the queuing engine and the control memory. The control state cache 160 (status cache) may be any type of storage device and preferably is a temporary hardware storage device.

The control state cache 160 includes a set of registers to hold control information read from the control memory 140, and logic to manipulate their states in response to various events. The control state cache 160 allows full utilization of the control memory 140 to start a queuing or de-queuing operation every cycle, without the risk of corrupting the control state when multiple dependent operations are in the pipeline. This is achieved by maintaining the control state for all the pending queuing/de-queuing operations in the control state cache 160, performing updates in the control state cache 160 when the control state for the queue being processed is already in the control state cache 160, and keeping track of the sequence of operations performed on each entry in the control state cache 160 using a set of state bits (discussed in detail later).

Figure 6:
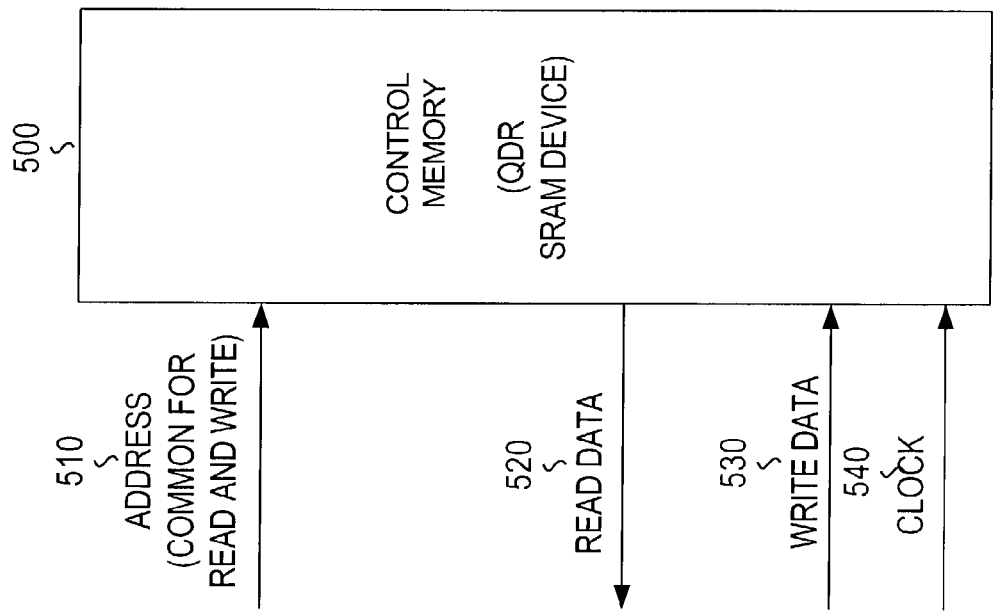
FIG. 6 illustrates an exemplary interface diagram for a control memory, according to one embodiment.

FIG. 6 illustrates an exemplary interface diagram for a control memory 500. As illustrated, the control memory 500 is a QDR SRAM that incorporates the pipeline stages therein. However, the pipelines could be separate from the control memory or in addition to the memory. Moreover, other types of devices could be utilized to provide the control memory, the pipeline stages, or both. The control memory 500 has a common address bus 510 and separate read and write data ports 520, 530. The operation of the device is synchronous with respect to a clock 540. The control memory device 500 can transfer data on both edges of the clock (every half cycle) during a read or write operation. That is, it supports dual data rate (DDR) operation.

Figure 7:
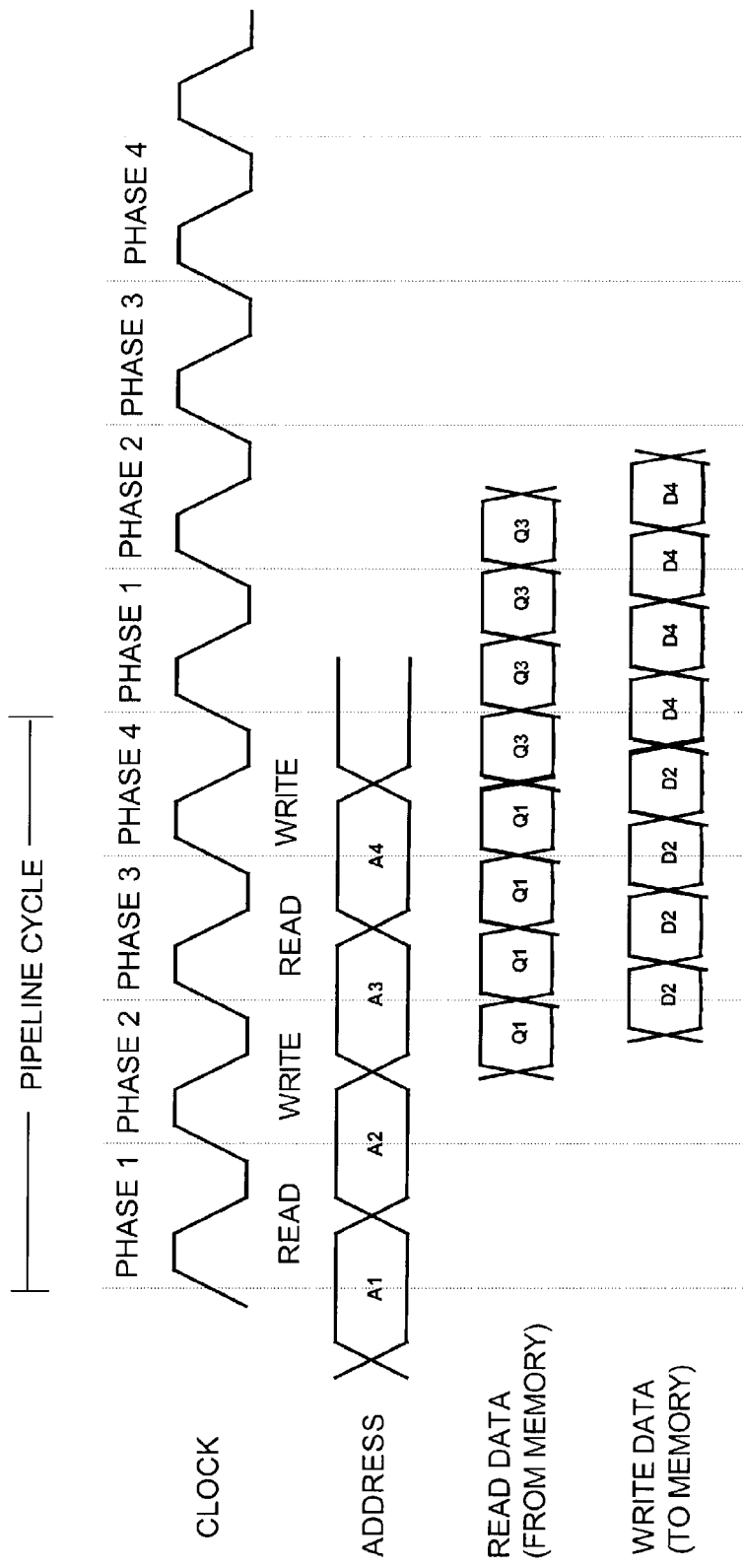
FIG. 7 illustrates an exemplary timing diagram for a control memory, according to one embodiment.

FIG. 7 illustrates an exemplary timing diagram for a control memory. The consecutive cycles of the clock are labeled Phase 1 through 4 and repeat indefinitely. The four consecutive clock cycles (Phases 1 through 4) are a pipeline cycle. A new address (read or write) can be supplied to the device during every phase. The read and write addresses must be supplied in alternate cycles. For example, a read can be initiated in Phase 1 and 3, and a write can be started in Phase 2 and 4. The data corresponding to a read address is available on a read data bus after some period of latency (e.g., 1.5 cycles). The read address is transferred as a burst of 4 words using 2 cycles (4 edges) of the clock. Similarly, the data corresponding to a write address is transferred, after some period of latency (e.g., 1 cycle), as a burst of four words using two clock cycles to a write data bus. This enables the read and write operations to be performed in parallel. Thus, the device is capable of performing two independent read operations and two independent write operations in every pipeline cycle.

As illustrated in FIG. 7, during phase 1 a read operation is initiated for queue having A1 as the address. The data associated with queue A1 is read from memory as a burst of four words (Q1) during phases 2-4 (only total of 2 clock cycles spread over three phases). During phase 2, a write operation is started for a queue at address A2. The data associated with this write operation is supplied as a burst of four words (D2) during phases 2-4 (only total of 2 clock cycles spread over three phases). Similarly, a second read operation, for a queue having an address of A3, is initiated during phase 3, and the data from this operation Q3 is transferred as a burst of four words from memory during phase 4 of the current pipeline cycle and phases 1-2 of the following pipeline cycle (total of 2 clock cycles). Finally, a second write operation is started during Phase 4, corresponding to a queue at address A4. The data associated with this operation D4 is supplied as a burst of 4 words during phase 4 of the current pipeline cycle and phases 1-2 of the following pipeline cycle.

The exemplary timing diagram shows how each and every phase of the clock can be used for an operation and does not require one operation to be complete before another is started. However, if a read or write of a particular queue was requested before processing on the queue was complete it is easy to see how stale control data may be used and the queue could become inconsistent. As previously mentioned this could lead to a corruption of the entire queue state and a failure of the system. For example, in FIG. 7 if during phase 1 of the second pipeline cycle the read was associated with queue A3 there would be a problem as A3 has not yet been read from memory for the previous read of phase 3 in the first pipeline cycle let alone any processing (e.g., queuing, de-queuing) associated therewith. The control state cache (status cache) is used to avoid these errors (discussed in more detail later).

Moreover, as the reads and writes may be associated with both queuing (en-queuing) and de-queuing, access to the control memory must be scheduled such that they do not conflict with each other. Between the queuing and de-queuing operations there is a total of at least seven statuses that the queues may have. Each of these statuses can be generated by a state machine and maintained in the control state cache (described in detail later). The statuses include:

ENQ_FETCH—control state for the corresponding queue is being fetched for a queuing process;

ENQ_PROCESS—control state in the register is being modified for a queuing process;

ENQ_STORE—writing the contents of the register back to the control state memory for a queuing process;

DQ_FETCH—control state for the corresponding queue is being fetched for a de-queuing process;

DQ_PROCESS—control state in the register is being modified for a de-queuing process;

DQ_STORE_writing the contents of the register back to the control state memory for a de-queuing process; and STORE_PENDING_writeback to the control state memory was initiated (by queuing or de-queuing process) but has not completed. Depending on the latency of the write operation, this status may continue for several clock cycles, that is, until the write operation is completed. These cycles are distinguished by separate states STORE_PENDING_1 STORE_PENDING_2, . . . , STORE_PENDING_K, where K is the number of cycles needed by the control memory to complete the write operation.

Figure 8:
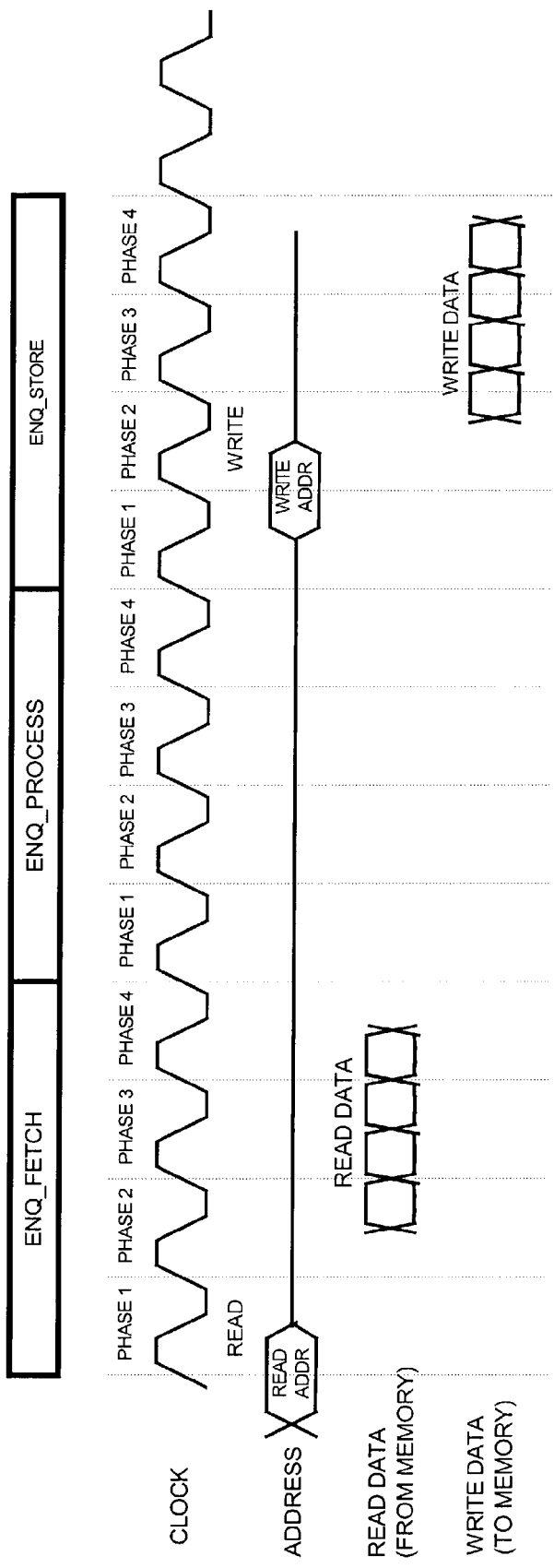
FIG. 8 illustrates an exemplary en-queuing operation using a three-stage pipeline, according to one embodiment.

FIG. 8 illustrates an exemplary en-queuing operation using a three-stage pipeline. Each pipeline stage includes the four phases of a clock, phase 1 through 4. A first stage is used to fetch the control information from control memory (ENQ_FETCH). The read operation to control memory is started during phase 1 of this stage, and the data is read out from memory subsequently in phases 2-4. A second stage of the pipeline is used to insert the block into the linked list (ENQ_PROCESS). As the processing of the data is not performed in the control memory no new operation is initiated to the control memory in the second stage of the pipeline. A third stage is used to store the modified control information back to the control memory (ENQ_STORE). A write to the control memory is initiated in phase 1 of this third stage. The address of this write operation is supplied to the memory at the start of phase 1, and the data is supplied as a burst of four words one cycle later, starting at the beginning of phase 2.

The operations in the three stages of the pipeline occur concurrently as is normal in such pipelined systems. That is, at any time, the pipeline may be (1) fetching control state information for a queue; (2) processing the control state fetched in the previous cycle for a second queue; and (3) storing the control state back to the control memory for a third queue. All of the above may be done in parallel. The three queues, being operated on by the three stages of the pipeline concurrently, may be all different, any two of them may be the same, or all three may be the same. It is the two latter cases that necessitate the use of the control state caching scheme.

Figure 9:
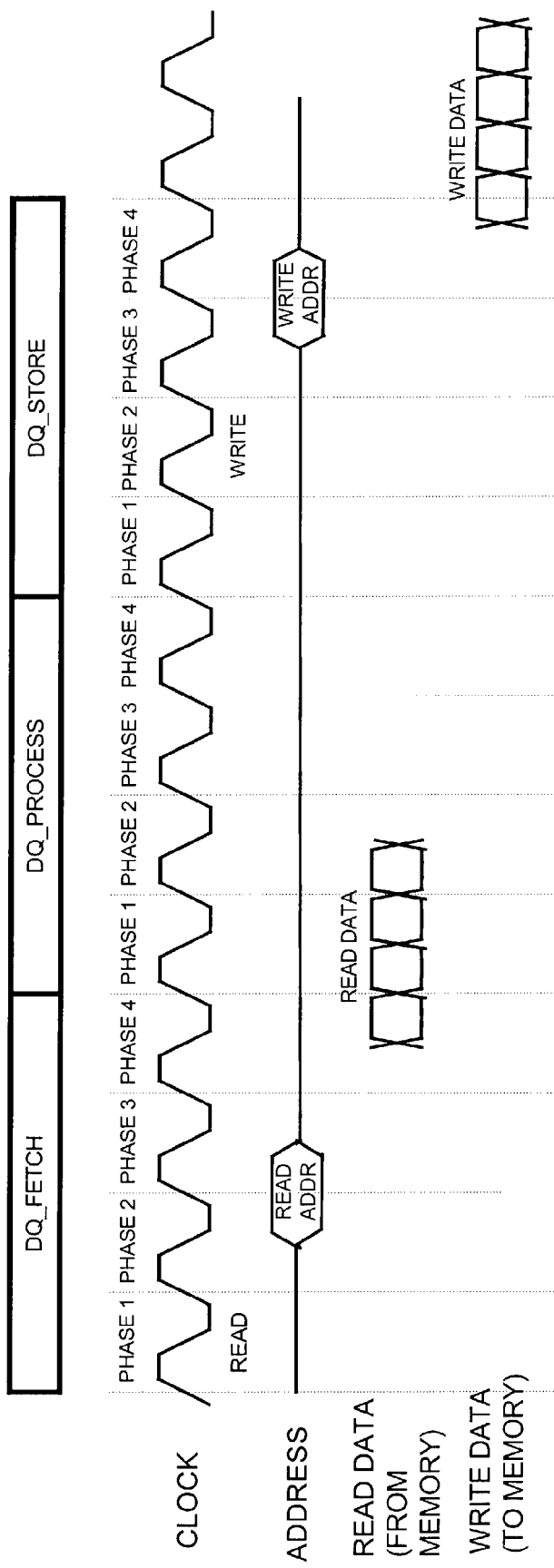
FIG. 9 illustrates an exemplary de-queuing operation using a three-stage pipeline, according to one embodiment.

FIG. 9 illustrates an exemplary de-queuing operation using a three-stage pipeline. The operations in this pipeline are executed concurrently with the operations in the en-queue pipeline described earlier. Each pipeline stage of the de-queue pipeline includes the four phases, phase 1 through 4, of the same clock used by the en-queue pipeline. A first stage of the de-queue pipeline is used to fetch the control information from control memory (DQ_FETCH). The address of the queue is supplied to the control memory in phase 2 of the DQ_FETCH stage, and the data is read out from memory as a burst of four words starting in the middle of phase 4 and ending in the middle of phase 2 of the next pipeline stage DQ_PROCESS. A second stage of the de-queue pipeline (DQ_PROCESS) is used to add the block to the link memory (linked list) and the data memory. As the processing of the data is not performed in the control state memory no new action is initiated during the DQ_PROCESS stage of the pipeline. A third stage of the de-queue pipeline (DQ_STORE) is used to store the modified control information back to the control memory. The address of the queue is supplied at the beginning of phase 4 of this stage, and the data is supplied subsequently as a burst of four words, starting at the end of phase 4 and proceeding through the middle of phase 2 of the following pipeline cycle.

Just as in the case of the en-queue pipeline, the operations in the three stages of the de-queue pipeline occur concurrently. That is, at any time, the pipeline may be (1) fetching control state information for a queue; (2) processing the control state fetched in the previous cycle for a second queue; and (3) storing the control state back to the control memory for a third queue. All of the above may be done in parallel. The three queues, being operated on by the three stages of the de-queue pipeline concurrently, may be all different, any two of them may be the same, or all three may be the same. In addition, because the en-queue pipeline and de-queue pipeline operate in parallel, all six of the pipeline stages are active at the same time. In the extreme case, all the six stages may be working on the same queue simultaneously. The control state caching scheme is needed to avoid inconsistencies in control state resulting from such parallel operations on the same queue.

Because the en-queue and de-queue operations proceed in parallel all six of the pipeline stages are active in each clock cycle. Therefore, access to the control memory from these pipeline stages must be scheduled such that they do not conflict with each other. Each of the stages ENQ_FETCH and DQ_FETCH needs to perform one read access to the control memory to fetch the control state. Similarly, the stages ENQ_STORE and DQ_STORE access the control memory to write back the updated control state. The stages ENQ_PROCESS and DQ_PROCESS do not access memory. Thus, the control memory must support 2 read accesses and 2 write accesses in each pipeline cycle.

Figure 10:
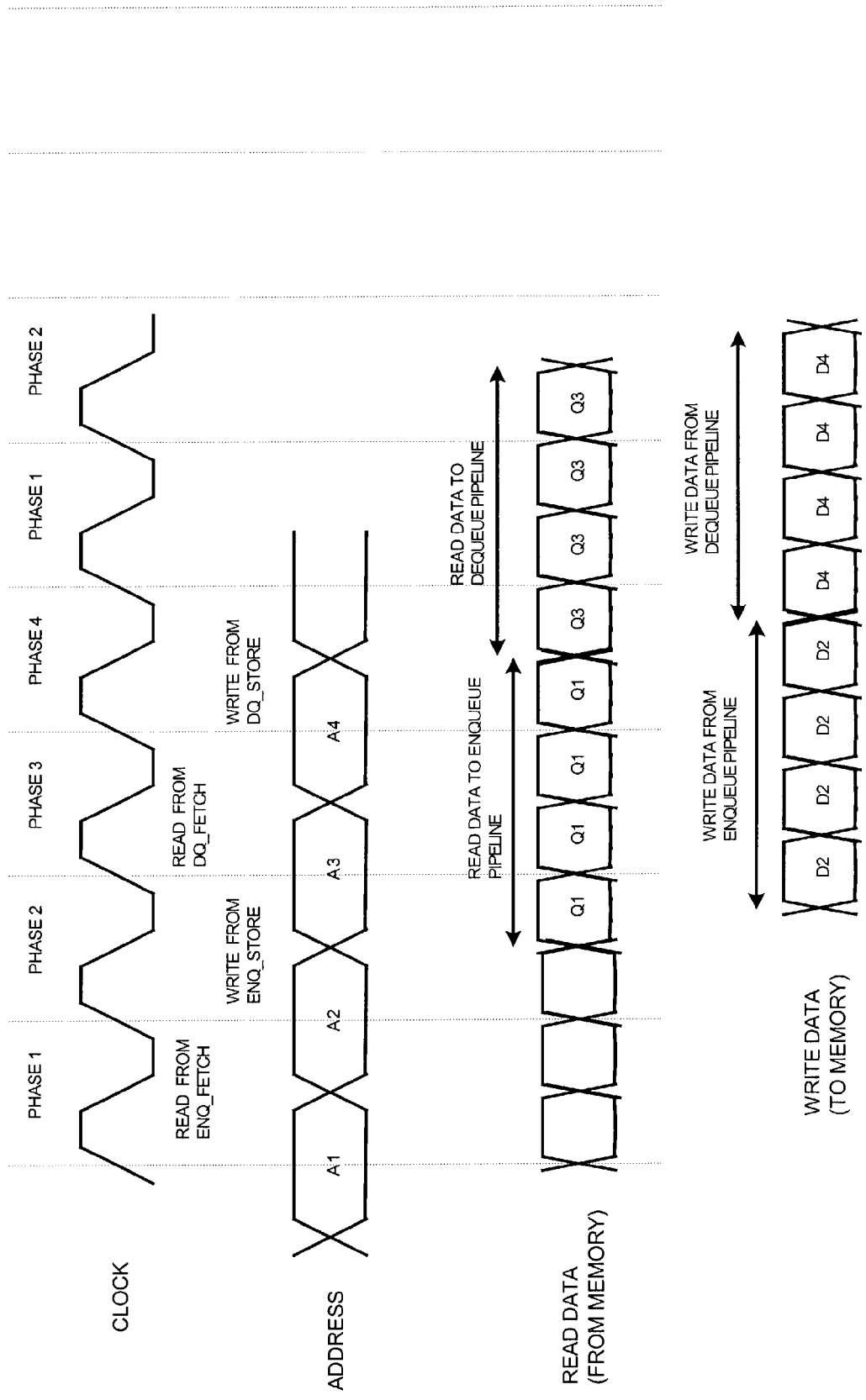
FIG. 10 illustrates an exemplary read and write schedule for both queuing and de-queuing operations, according to one embodiment.

FIG. 10 illustrates an exemplary read and write schedule for both queuing and de-queuing operations. The pipelines associated with the control memory (possibly located internal to the control memory if the control memory was a QDR SRAM device as described above) allow all four accesses to proceed in an overlapped fashion. In a first phase a read (queue address A1) from the ENQ_FETCH stage is initiated, and the data transfer (read data from pipeline) starts in the middle of phase 2. As previously discussed, the read from the en-queue pipeline is a burst of 4 words (illustrated as Q1 to represent the fact that these words are associated with a read operation for queue A1). The write (queue address A2) from the ENQ_STORE stage is initiated in phase 2, and the data transfer (write data to pipeline) starts at the end of phase 2. The write to the en-queue pipeline is a burst of 4 words (illustrated as D2 to represent the fact that the words are associated with a read operation for queue A2). The read (queue address A3) from the DQ_FETCH stage is started in phase 3, and the data transfer starts in the middle of phase 4. The read from the de-queue pipeline is a burst of 4 words (Q3). Finally, the write (queue address A4) from DQ_STORE is started in Phase 4 and the data transfer starts at the end of phase 4. The data for the write operation is a burst of 4 words (D4).

A store pipeline is used to keep track of the progress of the pending writes to the control memory started by the en-queue and de-queue pipelines. Both the en-queue pipeline and the de-queue pipeline initiate a write to the control memory in their third stage. Depending on the latency of the memory device and the number of pipeline stages in the write data path to the control memory, each write operation may take many clock cycles to complete. Because a read to the control memory at the same queue address as a pending write will provide stale information, each write operation is tracked until it is complete. The store pipeline performs this operation. This pipeline includes K stages, where K is the number of pipeline cycles needed for the memory to complete a write operation. The pipeline cycles of the store pipeline are synchronized to the cycles of the en-queue and de-queue pipelines, and have the same duration. Each of the K stages keeps track of the progress of the write operations started by the en-queue and de-queue pipelines in a previous cycle. Because as many as two write operations may be started in each pipeline cycle (one by the en-queue pipeline and one by the de-queue pipeline), the store pipeline needs to keep track of progress of two write operations in each stage. No new memory operations are initiated by the store pipeline.

Figure 11:
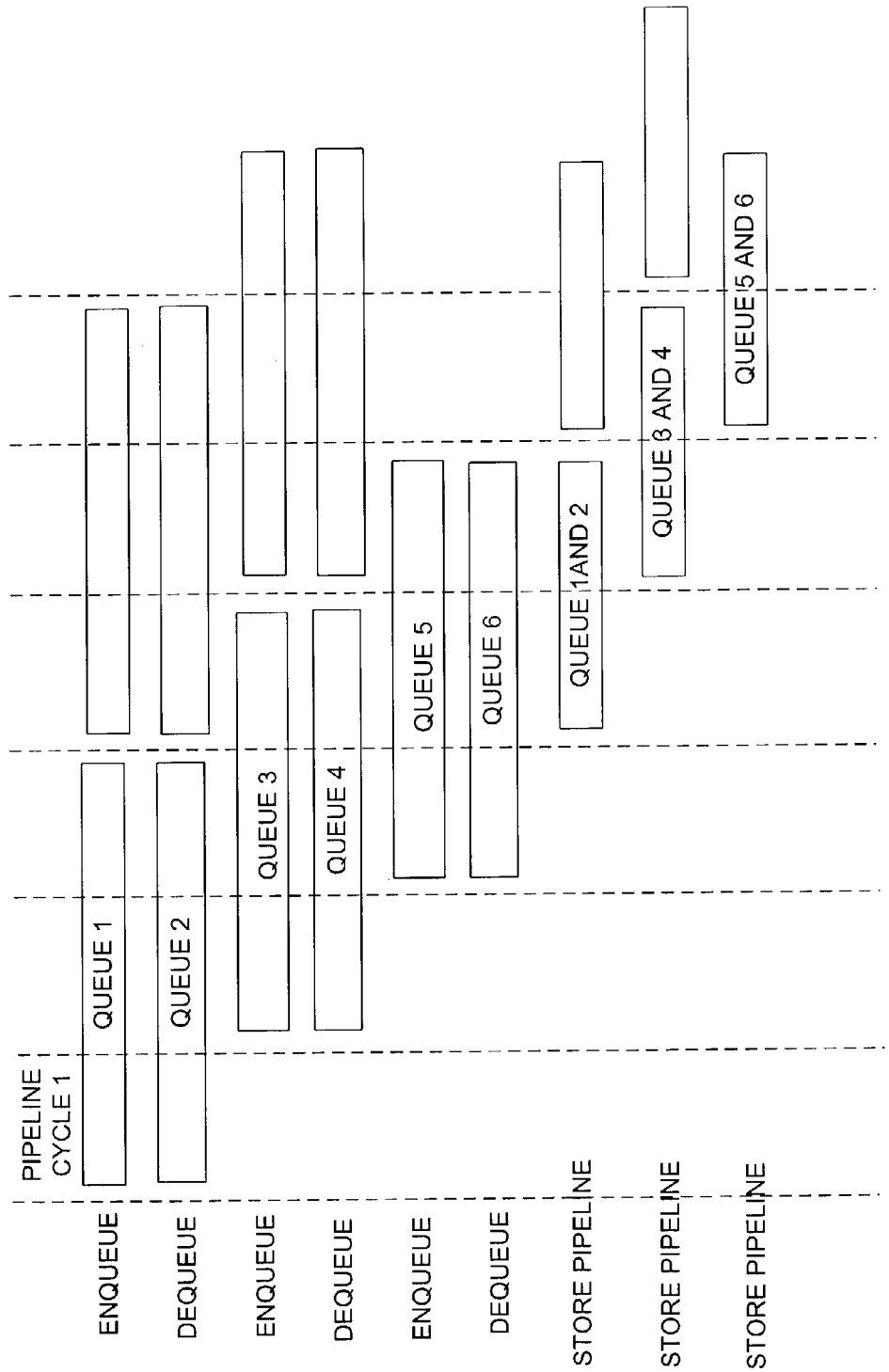
FIG. 11 illustrates an exemplary timing diagram of operations of the en-queue, de-queue, and store pipelines overlapped, according to one embodiment.

FIG. 11 illustrates an exemplary timing diagram of operations of the en-queue, de-queue, and store pipelines overlapped. This illustrative example assumes two stages for the store pipeline (K=2). In this example, an en-queue operation on queue 1 is started in pipeline cycle 1, and a de-queue operation on queue 2 is started simultaneously. These operations continue until the end of pipeline cycle 3. Meanwhile, a new en-queue operation and a new de-queue operation are both started in pipeline cycle 2, on queue 3 and queue 4, respectively. Another pair of en-queue and de-queue operations is started in the next pipeline cycle, this time on queues 5 and 6, respectively. Thus, during the pipeline cycle 3, all six of the pipeline stages are active in the en-queue and de-queue pipeline. The en-queue and de-queue operations on queues 1 and 2, respectively, are completed at the end of pipeline cycle 3, but it takes two more pipeline cycles for the memory device to complete the write operation stated by the third stage of each of the en-queue and de-queue pipelines. The store pipeline keeps track of these pending write operations in pipeline cycles 4 and 5. It should be noted that some of these queue numbers could be the same.

Each of the pipeline cycles in FIG. 11 includes the four phases described earlier, and may initiate a total of 2 reads and 2 writes to the control memory. By scheduling the memory accesses in distinct phases, as illustrated in FIG. 10, all the four accesses to the memory can proceed in parallel.

As previously mentioned parallel execution of the en-queue and de-queue pipelines can lead to inconsistent results if the pipelines operate on the same queue index. This could result in corruption of the queue state and may lead to system failure. The control state cache eliminates this problem by keeping the control state for queues currently being processed within the cache and maintaining coherency of the control state.

Figure 12:
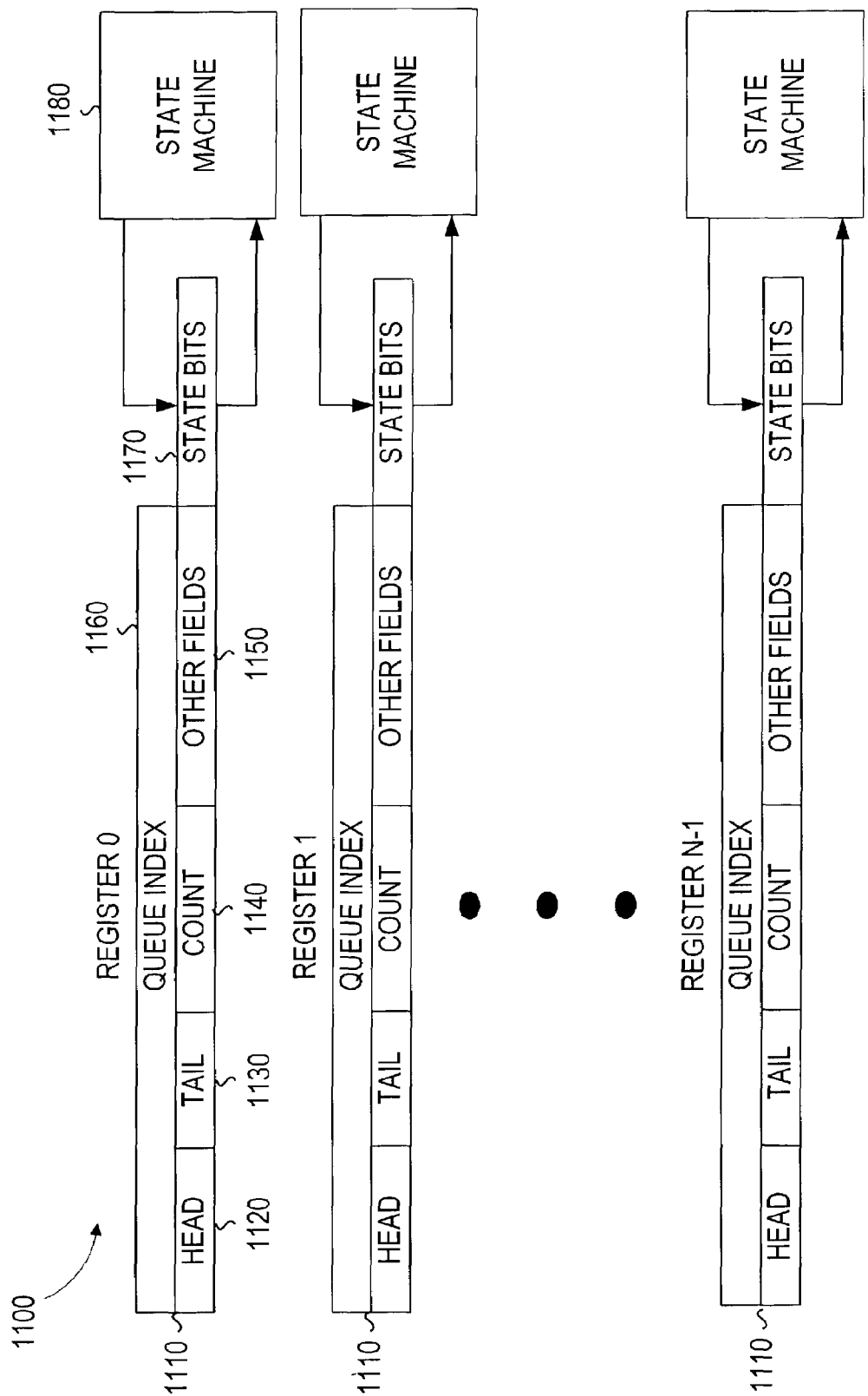
FIG. 12 illustrates an exemplary block diagram of the control state cache, according to one embodiment.

FIG. 12 illustrates an exemplary block diagram of the control state cache 1100. The control state cache 1100 includes a set N of registers 1110 labeled 0 through N-1, each register storing the contents of the control state information corresponding to a specific queue index. Each register 1110 is divided into a number of fields, each corresponding to a field of the control state stored in the control memory. This includes the head and tail pointers 1120, 1130, a count of the packets or bytes corresponding to the queue 1140, and other system-specific state information (other fields) maintained in the control memory 1150. In addition, each register 1110 has a field that stores a queue index 1160 of the control state contained in that register. This is required to identify the index of the cached control state while searching and manipulating the information in the cache 1100. The capacity of the control state cache 1100 is determined by the latency of the control memory pipeline. Typically 8 or 16 entries are adequate with current-generation memory devices. Each register in the control state cache 1100 also has an associated set of state bits 1170 that together describes the current state of the cache entry.

Thus, when the control state for a specific queue is fetched from the control memory in the ENQ_FETCH or DQ_FETCH stages, the index of the queue being fetched is compared with all the active cache entries in parallel. If there is a match, the control state stored in the control state cache 1110 is used in place of the fetched data from the control memory. The fetched control state from control memory is used only when the control state is not found in the cache 1100. In addition, the control state read from memory is stored in a free register in the control state cache 1100 (if it is not already in the cache) for use by the subsequent stages of the pipeline.

The processing stages of the pipelines (ENQ_PROCESS and DQ_PROCESS) perform the processing associated with the en-queuing and de-queuing operations, respectively. These operations are performed on the cache register in the control state cache 1100 holding the control state for the queue being processed, and may modify the head, tail and count fields in the register. This enables the processing of the two pipelines to be performed in parallel. If the ENQ_PROCESS and DQ_PROCESS stages are operating on different queue indices, the two will be working on different registers 1110 in the control state cache 1100. Therefore, the operations can proceed without a conflict. However, if the ENQ_PROCESS and DQ_PROCESS stages are working on the same queue index at the same time the two processes will also work on the same register 1110 in the control state cache 1100. The two operations can still be allowed to proceed in parallel by incorporating additional logic to combine the two operations. For example, the ENQ_PROCESS may increment the count field in the control state cache register, while the DQ_PROCESS may decrement the same field. These two can be combined as a single update of the count field.

The en-queue process writes back the modified data in the control state cache 1100 to the control memory during the ENQ_STORE stage of the pipeline. Similarly, the DQ_STORE pipeline performs the writeback during the DQ_STORE cycle. Subsequently, the store pipeline will keep track of the progress of these write operations. If the number of stages in the store pipeline is K, the register in control state cache 1100 that was written back by the en-queue or de-queue pipeline K cycles ago is now free to allocate to a new control state, unless another en-queue or de-queue operation in the pipeline is working on the same queue.

Figure 13:
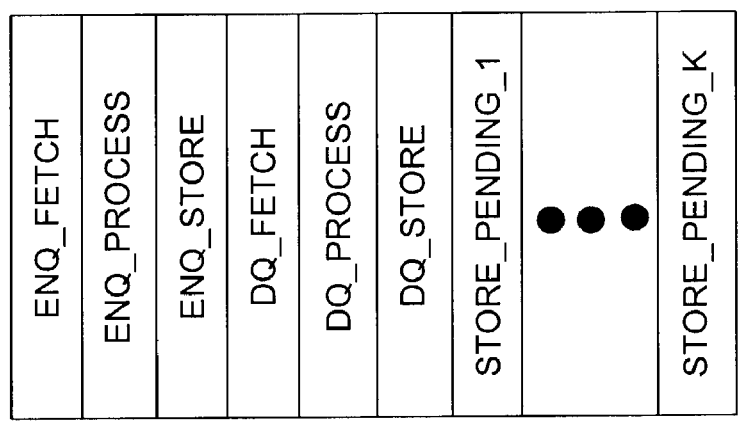
FIG. 13 illustrates an exemplary state bit association for the different processes, according to one embodiment.

As operations are performed by the en-queue and de-queue pipelines on the control state in the control state cache 1100, the state of the register 1110 in the cache 1100 containing the control state is tracked by a set of state bits. The state bits are set and cleared by a state machine 1180. FIG. 13 illustrates an exemplary state bit association with the different processes that may be being performed on a queue. These bits are stored in each of the registers 1110 in the control state cache 1100 for the associated queue. Each bit is set by one of the pipeline stages when it is processing the control state from that register 1110. When the state bit is set for a certain operation that operation is being performed. Multiple operations may be being performed on the same queue at the same time.

The state machine 1180 is responsible for setting and clearing the state bits in response to various events in the en-queue, de-queue and store pipelines. The full state of each entry in the control state cache 1100 is described by the values of all the corresponding state bits, taken together. For example, in the extreme case, the ENQ_FETCH, ENQ_PROCESS, ENQ_STORE, DQ_FETCH, DQ_PROCESS, DQ_STORE, and STORE_PENDING_1 through STORE_PENDING_K can all be set. This corresponds to a single queue having three blocks in the three stages of the en-queue pipeline, three blocks in the de-queue pipeline, and K write operations in progress (one from each of the K previous pipeline cycles). The state bits are used to (1) determine the most recent value of the control state associated with it (head pointer, tail pointer and count), (2) to coherently update the count field when there are multiple blocks belonging to a queue in the pipelines, and (3) to determine if the corresponding register is free to allocate to a new queue index.

Figure 14:
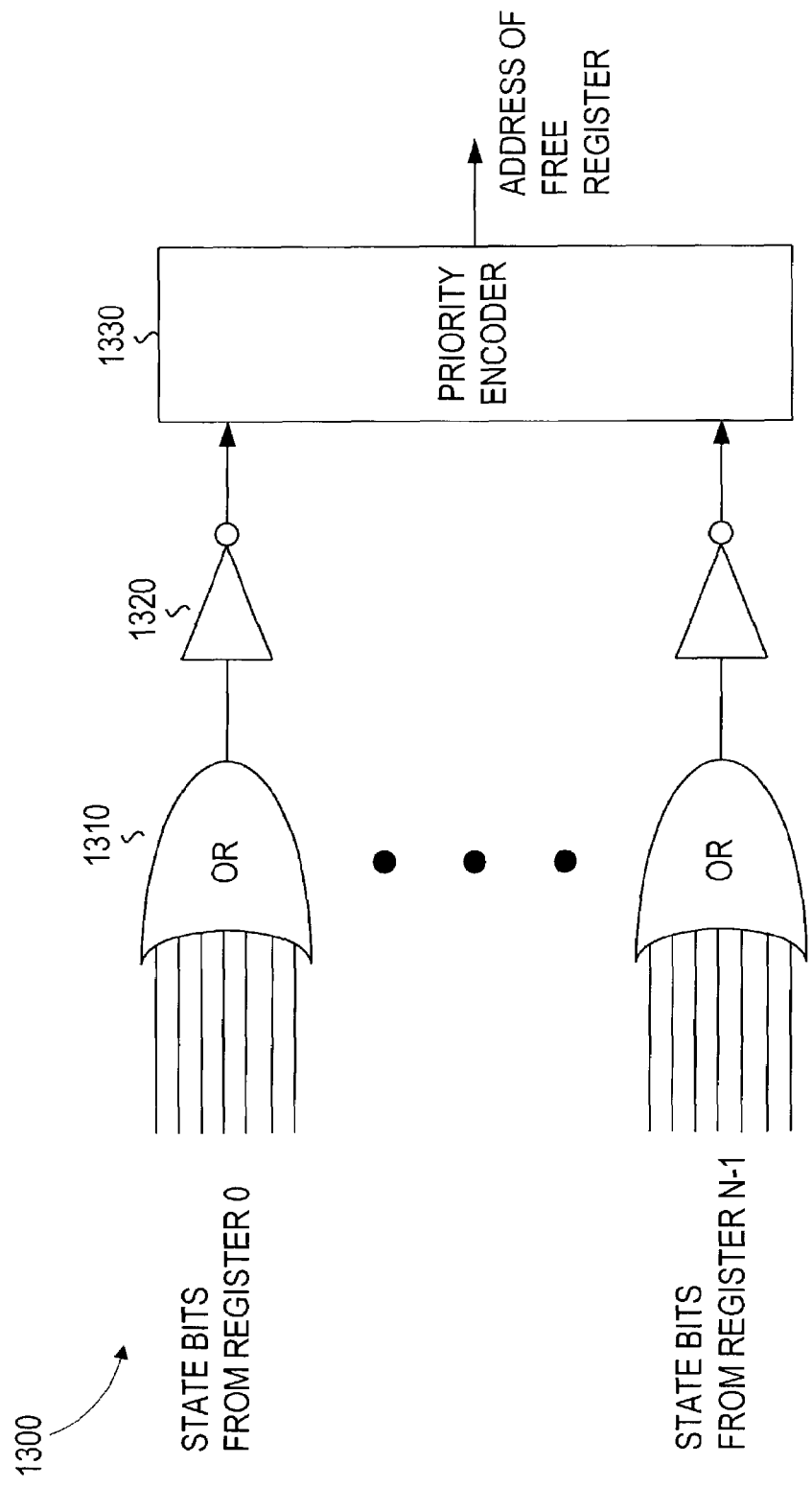
FIG. 14 illustrates an exemplary logic circuit, according to one embodiment.

FIG. 14 illustrates an exemplary logic circuit 1300 used to determine the address of a free register in the control state cache when a new control state needs to be stored in the cache. The logic circuit 1300 includes logical ORs 1310 for each of the state bits associated with each register, an inverter 1320 for inverting the resulting signal (so that a logical "1" output is obtained when all state bits are zero), and a priority encoder 1330 to put out the address corresponding to the first "1" at its input. If all the state bits are zero, the associated register is free and can be allocated to a new queue control state being read from the control state memory.

The number of cache entries needed in the control state cache is determined by the maximum number of distinct queue indices that can be in the pipelines simultaneously. The en-queue pipeline and the de-queue pipeline may each have a maximum of three queues being processed at the same time. The store pipeline has K stages and may be keeping track of a maximum of 2 K pending writes (started by the en-queue and de-queue pipelines in the last K cycles). Thus, the maximum size of the control cache needed is 2 K+6.

Although the various embodiments have been illustrated by reference to specific embodiments, it will be apparent that various changes and modifications may be made. Reference to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

Different implementations may feature different combinations of hardware, firmware, and/or software. For example, some implementations feature computer program products disposed on computer readable mediums. The programs include instructions for causing processors to perform techniques described above.

The various embodiments are intended to be protected broadly within the spirit and scope of the appended claims.

What is claimed is:

1. An apparatus comprising:
a status storage device to maintain status information for each of the plurality of queues;
a status cache, separate from the status storage device, to maintain the status information for a subset of the plurality of queues that are undergoing processing; and
a queuing engine to queue incoming data and de-queue outgoing data, wherein when queuing data said queuing engine reads the status information for a queue prior to queuing and writes updated status information thereafter and when de-queuing data said queuing engine reads the status information for a queue prior to de-queuing and writes updated status information thereafter, wherein said queuing engine reads and writes the status information for the subset of the plurality of queues from said status cache and reads and writes the status information for remaining ones of the plurality of queues from said status storage device.

2. The apparatus of claim 1, wherein said status cache writes the status information for each of the subset of the plurality of queues back to said status storage device upon completion of the processing for each respective queue.

3. The apparatus of claim 1, further comprising status pipelines to provide throughput between said status storage device and said queuing engine.

4. The apparatus of claim 3, wherein said status pipelines are part of said status storage device.

5. The apparatus of claim 1, wherein the reading from and the writing to said status storage device are performed on alternative clock cycles.

6. The apparatus of claim 5, wherein the reading from and the writing to said status storage device alternate between queuing and de-queuing.

7. The apparatus of claim 1, further comprising a data storage device to store data associated with each of the plurality of queues.

8. The apparatus of claim 7, further comprising data pipelines to provide throughput between said data storage device and said queuing engine.

9. The apparatus of claim 8, wherein said data pipelines are part of said data storage device.

10. The apparatus of claim 7, further comprising a data cache to maintain a copy of data being written or planned to be written to said data storage device, wherein the data from the data cache will be used if the data is required before the data is written to the data storage device.

11. The apparatus of claim 7, wherein said data storage device is divided into a plurality of blocks and each queue is associated with at least one block.

12. The apparatus of claim 11, further comprising a link storage device to link blocks within the data storage device for queues having data in more than one block.

13. The apparatus of claim 12, wherein said status cache maintains the status information for the subset of the plurality of queues that are reading a status associated with a selected queue, performing an action on the selected queue, or updating the status of the selected queue.

14. The apparatus of claim 13, wherein the performing an action includes adding data to said data storage device, adding a link to said link storage device, removing data from said data storage device, or and removing a link from said link storage device.

15. The apparatus of claim 1, wherein the status information includes head, tail and count for each queue.

16. In a store and forward device, a method comprising:
receiving processing instructions for a queue;
checking a status cache for status information for the queue, wherein the status information will be in the status cache if the queue is undergoing processing;
reading the status information for the queue, wherein the status information will be read from the status cache if available therein, and wherein the status information will be read from a status storage device if the status is not available in the status cache;
processing the queue; and
writing updated status information for the queue in the status cache.

17. The method of claim 16, wherein the status information includes head, tail and count for each queue.

18. The method of claim 16, wherein said processing includes adding data to a data storage device, adding a link to a link storage device, removing data from the data storage device, or removing a link from the link storage device.

19. The method of claim 16, wherein for each queue said reading the status occurs in a first phase, said performing associated actions occur in a second phase, and said writing an update occurs in a third phase.

20. The method of claim 16, wherein said reading and said writing are performed on alternative clock cycles.

21. The method of claim 16, wherein said reading and said writing alternate between queuing and de-queuing operations.

22. The method of claim 16, further comprising writing all data being written or planned to be written to a data storage device to a data cache, wherein the data from the data cache will be used if the data is required before the data is written to the data storage device.

23. A store and forward device comprising:
a plurality of receivers to receive packets of data;
a storage medium to store the packets of data in a plurality of queues;
a plurality of transmitters to transmit the packets of data from the queues;
a status storage device to maintain status information for each of the plurality of queues;
a status cache, different from the control storage device, to maintain the status information for a subset of the plurality of queues that are undergoing processing; and
a queuing engine to queue incoming data and de-queue outgoing data, wherein said queuing engine reads the status information for a queue prior to respective queuing and de-queuing and writes updated status information thereafter, wherein said queuing engine reads and writes the status information for the subset of the plurality of queues from said status cache and reads and writes the status information for remaining ones of the plurality of queues from said status storage device.

24. The device of claim 23, wherein said status cache writes the status for each of the subset of the plurality of queues back to said status storage device upon completion of the processing for each respective queue.

25. The device of claim 23, further comprising a data cache to maintain a copy of data being written or planned to be written to said storage medium, wherein the data from the data cache will be used if the data is required before the data is written to the storage medium.

26. The device of claim 23, wherein said storage medium is divided into a plurality of blocks and each queue is associated with at least one block.

27. The device of claim 26, further comprising a link storage device to link blocks within the storage medium for queues having data in more than one block.

28. The device of claim 23, wherein said receivers are Ethernet cards.

29. The device of claim 23, further comprising an optical backplane.

30. An apparatus comprising:
a data storage device to store packets in appropriate queues;
a control storage device to maintain state information for each of the queues, wherein the state information includes head and tail pointers for each queue;
a control cache to temporarily maintain the state information for a subset of the queues that are undergoing processing; and
a queuing engine to read the state information for a queue, process the queue, and write updated state information, wherein the queuing engine reads the state information for the subset of the queues from the control cache and writes the updated state information to the control cache.

31. The apparatus of claim 30, wherein the control cache also tracks status of queue processing.

32. The apparatus of claim 30, wherein the control cache maintains the state information until the control storage device has up to date state information.

33. The apparatus of claim 30, wherein the control cache writes the updated state information to the control storage device.

34. The apparatus of claim 30, wherein the processing of the queue includes queuing and dequeuing packets.

35. The apparatus of claim 30, further comprising a data cache to maintain a copy of the packets being written to the data storage device, wherein the queuing device reads the packets from the data cache if the packets are being read before the writing the packets to the data storage device is complete.

36. The apparatus of claim 30, wherein the data storage device is divided into a plurality of blocks and each queue is associated with at least one block, and further comprising a link storage device to track links between blocks within the data storage device for queues having packets in more than one block.

* * * * *